United States Patent
Greenwood et al.

(10) Patent No.: US 11,415,154 B2
(45) Date of Patent: Aug. 16, 2022

(54) HYDRAULIC SYSTEMS AND METHODS FOR NESTED PRESSURE REGULATING VALVES

(71) Applicant: HUSCO INTERNATIONAL, INC., Waukesha, WI (US)

(72) Inventors: Jason Greenwood, Milwaukee, WI (US); Nicole Peacock, Milwaukee, WI (US); Andreas S. Pack, Chester (GB)

(73) Assignee: HUSCO International, Inc., Waukesha, WI (US)

( * ) Notice: Subject to any disclaimer, the term of this patent is extended or adjusted under 35 U.S.C. 154(b) by 273 days.

(21) Appl. No.: 16/846,944

(22) Filed: Apr. 13, 2020

(65) Prior Publication Data
US 2020/0325914 A1    Oct. 15, 2020

Related U.S. Application Data

(60) Provisional application No. 62/833,388, filed on Apr. 12, 2019.

(51) Int. Cl.
*F15B 11/028* (2006.01)
*F15B 1/033* (2006.01)
(Continued)

(52) U.S. Cl.
CPC ............ *F15B 1/033* (2013.01); *B60T 13/662* (2013.01); *B60T 13/686* (2013.01); *B60T 15/028* (2013.01);
(Continued)

(58) Field of Classification Search
CPC ............. F15B 11/028; F15B 11/08; F15B 2211/30565; F15B 2211/46; B60T 15/028; B60T 15/36
(Continued)

(56) References Cited

U.S. PATENT DOCUMENTS

| | | | |
|---|---|---|---|
| 5,025,626 A | 6/1991 | Crasser | |
| 6,845,962 B1 * | 1/2005 | Barron | G05D 7/0694 |
| | | | 137/596.16 |
| 6,931,847 B1 | 8/2005 | Throckmorton | |
| 9,410,562 B2 * | 8/2016 | Besemer | F15B 11/162 |
| 9,618,019 B2 * | 4/2017 | Jung | F15B 15/149 |

(Continued)

FOREIGN PATENT DOCUMENTS

| | | | | |
|---|---|---|---|---|
| FR | 3057917 A1 * | 4/2018 | ............ | B60K 17/356 |
| GB | 2517560 A | 2/2015 | | |

(Continued)

OTHER PUBLICATIONS

Bell & Gosset. Two pressure-reducing valves (PRVs) in series (Two-step pressure reduction). Webpage Mar. 2016.

(Continued)

*Primary Examiner* — Michael Leslie
(74) *Attorney, Agent, or Firm* — Quarles & Brady LLP (57) ABSTRACT

A hydraulic system is provided. The hydraulic system may include a fluid pressure source in fluid communication with a supply line, a return line in fluid communication with a tank, a hydraulic function having a workport, a first control valve having a first proportional solenoid, a second control valve having a second proportional solenoid, and a controller. The controller being configured to selectively energize the first proportional solenoid, the second proportional solenoid, or the first proportional solenoid and the second proportional solenoid to control a system pressure differential, defined between the return line and the workport, within a range that is defined by a sum of a first predefined range defined by the first control valve and a second predefined range defined by the second control valve.

31 Claims, 3 Drawing Sheets

(51) Int. Cl.
  *B60T 15/02* (2006.01)
  *B60T 13/66* (2006.01)
  *B60T 13/68* (2006.01)
  *F15B 21/08* (2006.01)
  *F15B 13/044* (2006.01)
  *B60T 15/36* (2006.01)

(52) U.S. Cl.
  CPC ........ *F15B 11/028* (2013.01); *F15B 13/0442* (2013.01); *F15B 21/08* (2013.01); *B60T 15/36* (2013.01); *F15B 2211/30565* (2013.01); *F15B 2211/40576* (2013.01); *F15B 2211/46* (2013.01); *F15B 2211/526* (2013.01); *F15B 2211/57* (2013.01)

(58) Field of Classification Search
  USPC ............................ 91/444, 446, 450, 451, 459
  See application file for complete search history.

(56) References Cited

U.S. PATENT DOCUMENTS

| | | | | |
|---|---|---|---|---|
| 10,710,566 | B2* | 7/2020 | Lucchino | B60T 13/686 |
| 2018/0304877 | A1* | 10/2018 | Ciarrocchi | B60T 13/22 |
| 2020/0361435 | A1* | 11/2020 | Meid | B60T 1/065 |

FOREIGN PATENT DOCUMENTS

| | | | | |
|---|---|---|---|---|
| JP | 2015086963 A | * | 5/2015 | E02F 9/226 |
| WO | 2014143795 A1 | | 9/2014 | |

OTHER PUBLICATIONS

Danfoss. EHi Steering Valve Technical Information for Ehi for Load Sensing Reactino steering System. Jan. 2018. 4 pages.

Intellectual Property Office. Search Report for GB2005377.3. Dated Oct. 1, 2020. 1 page.

* cited by examiner

HYDRAULIC SYSTEMS AND METHODS FOR NESTED PRESSURE REGULATING VALVES

CROSS-REFERENCES TO RELATED APPLICATIONS

The present application is based on, claims priority to, and incorporates herein by reference in its entirety, U.S. Provisional Patent Application No. 62/833,388, filed on Apr. 12, 2019.

STATEMENT REGARDING FEDERALLY SPONSORED RESEARCH

Not Applicable.

BACKGROUND

In some hydraulic systems, a control valve may be utilized to regulate a pressure differential between an inlet of the valve and an outlet of the valve.

BRIEF SUMMARY

The present disclosure provides systems and methods for nested pressure regulating valves that enable the control of a pressure differential within a range that is the sum of the regulation ranges of the individual pressure regulating valves. For example, a hydraulic system may include a first control valve and a second control valve that individually are configured to control a pressure differential between in a first predefined range and a second predefined range, respectively. The first control valve may be in fluid communication with the second control valve to enable a system pressure differential to be controlled within a range that is the sum of the first predefined range and the second predefined range.

In one aspect, the present disclosure provides a hydraulic system that includes a fluid pressure source in fluid communication with a supply line, a return line in fluid communication with a tank, a hydraulic function having a workport, a first control valve, a second control valve, and a controller. The first control valve includes a first supply port, a first control port, a first reference port, and a first proportional solenoid. The first supply port is in fluid communication with the supply line and the first reference port is in fluid communication with the return line. The first proportional solenoid is configured to provide a first output force on the first control valve to control a first pressure differential between the first control port and the first reference port within a first predefined range. The second control valve includes a second supply port, a second control port, a second reference port, and a second proportional solenoid. The second supply port is in fluid communication with the supply line. The second reference port is in fluid communication with the first control port, and the second control port is in fluid communication with the workport. The second proportional solenoid is configured to provide a first output force on the second control valve to control a second pressure differential between the second control port and the second reference port within a second predefined range. The controller is in communication with the first proportional solenoid and the second proportional solenoid. The controller is configured to selectively energize the first proportional solenoid, the second proportional solenoid, or the first proportional solenoid and the second proportional solenoid to control a system pressure differential, defined between the return line and the workport, within a range that is defined by a sum of the first predefined range and the second predefined range.

In one aspect, the present disclosure provides a hydraulic system that includes a fluid pressure source in fluid communication with a supply line, a return line in fluid communication with a tank, a hydraulic function having a workport, a first control valve, a second control valve, and a controller. The first control valve includes a first supply port, a first control port, a first reference port, and a first proportional solenoid. The first supply port is in fluid communication with the supply line and the first reference port is in fluid communication with the return line. The first proportional solenoid is configured to provide a first output force on the first control valve to control a first pressure differential between the first control port and the first reference port within a first predefined range; The second control valve includes a second supply port, a second control port, a second reference port, and a second proportional solenoid. The second supply port is in fluid communication with the supply line. The second reference port is in fluid communication with the first control port, and the second control port is in fluid communication with the workport. The second proportional solenoid is configured to provide a second output force on the second control valve to control a second pressure differential between the second control port and the second reference port within a second predefined range. The controller in communication with the first proportional solenoid and the second proportional solenoid. The controller is configured to selectively energize the first proportional solenoid, the second proportional solenoid, or the first proportional solenoid and the second proportional solenoid to control a system pressure differential, defined between the return line and the workport, from a minimum system pressure differential defined by a minimum pressure in a combination of the first predefined range and the second predefined range to a maximum system pressure differential defined by a sum of a maximum pressure in each of the first predefined range and the second predefined range.

In one aspect, the present disclosure provides a hydraulic system that includes a fluid pressure source in fluid communication with a supply line, a return line in fluid communication with a tank, a hydraulic function having a workport, a first control valve, a second control valve, and a controller. Each of the first control valve and the second control valve includes a supply port, a control port, a reference port, and a proportional solenoid. Each of the supply ports is in fluid communication with the supply line and the control port of the first control valve is in fluid communication with the reference port of the second control valve. Each of the proportional solenoids is configured to selectively provide an output force on a respective one of the first control valve and the second control valve to control a system pressure differential defined between the reference port of the first control valve and the control port of the second control valve. The controller is in communication with each of the proportional solenoids. The controller being configured to selectively energize the proportional solenoid of the first control valve, the proportional solenoid of the second control valve, or both of the proportional solenoids to control the system pressure differential. The fluid communication between the control port of the first control valve and the reference port of the second control valve enables the first control valve and the second control valve to additively regulate the system pressure differential.

The foregoing and other aspects and advantages of the disclosure will appear from the following description. In the description, reference is made to the accompanying drawings which form a part hereof, and in which there is shown by way of illustration a preferred configuration of the disclosure. Such configuration does not necessarily represent the full scope of the disclosure, however, and reference is made therefore to the claims and herein for interpreting the scope of the disclosure.

BRIEF DESCRIPTION OF DRAWINGS

The invention will be better understood and features, aspects and advantages other than those set forth above will become apparent when consideration is given to the following detailed description thereof. Such detailed description makes reference to the following drawings.

DETAILED DESCRIPTION

Before any aspect of the present disclosure are explained in detail, it is to be understood that the present disclosure is not limited in its application to the details of construction and the arrangement of components set forth in the following description or illustrated in the following drawings. The present disclosure is capable of other configurations and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The following discussion is presented to enable a person skilled in the art to make and use aspects of the present disclosure. Various modifications to the illustrated configurations will be readily apparent to those skilled in the art, and the generic principles herein can be applied to other configurations and applications without departing from aspects of the present disclosure. Thus, aspects of the present disclosure are not intended to be limited to configurations shown, but are to be accorded the widest scope consistent with the principles and features disclosed herein. The following detailed description is to be read with reference to the figures, in which like elements in different figures have like reference numerals. The figures, which are not necessarily to scale, depict selected configurations and are not intended to limit the scope of the present disclosure. Skilled artisans will recognize the non-limiting examples provided herein have many useful alternatives and fall within the scope of the present disclosure.

Generally, the present disclosure provides a hydraulic system that includes two solenoid-operated proportional pressure regulating valves (EPRVs) that may be used to achieve a greater system pressure differential range than either of the EPRVs can achieve alone. A control port of the first EPRV may be connected to a reference port of the second EPRV. This arrangement of the EPRVs may be referred to herein as "nested." The resulting system differential pressure is the sum of the individual control pressure differentials. In other words, the system differential pressure may be variable via the two EPRVs between a minimum pressure and twice a maximum pressure achievable by one of the EPRVs, and any pressure in between.

Figure 1:
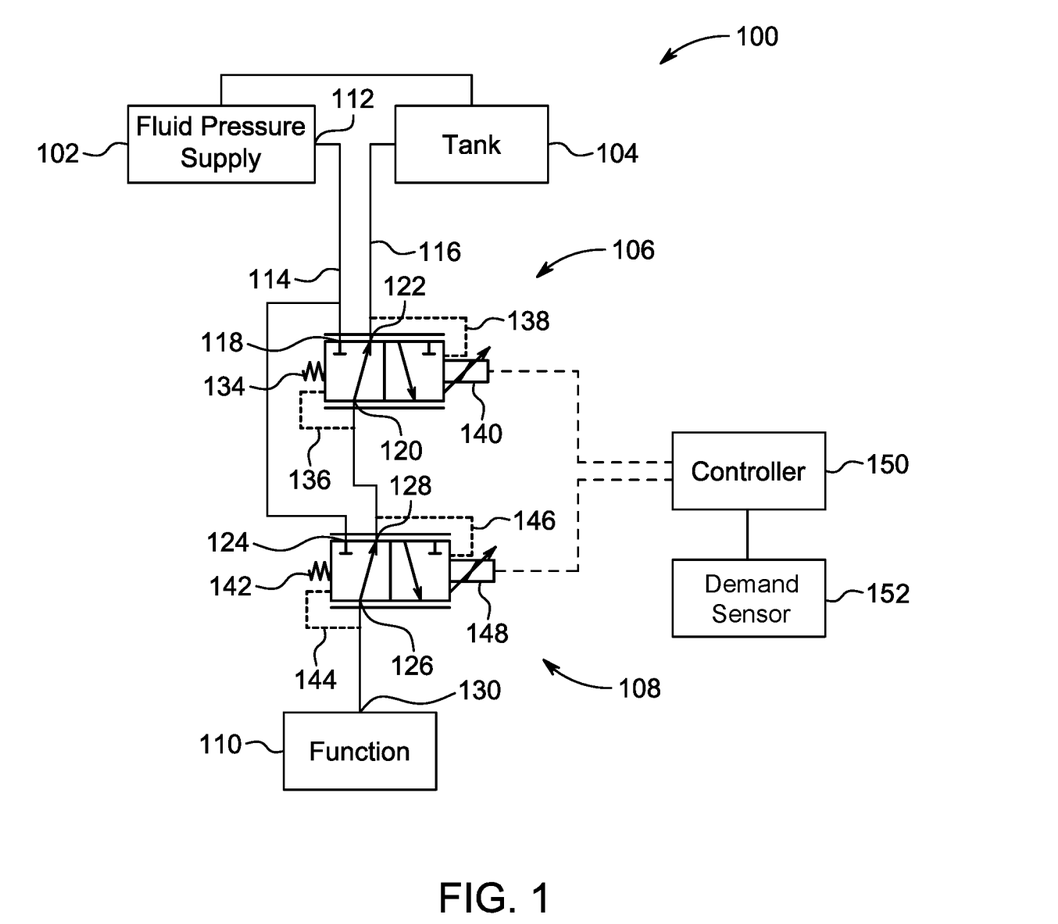
FIG. 1 is a schematic illustration of a hydraulic system including nested pressure regulating valves according to the present disclosure.

FIG. 1 illustrates a hydraulic system 100 according to one aspect of the present disclosure. The hydraulic system 100 may include a fluid pressure supply 102, a tank, sump, or reservoir 104, a first control valve 106, a second control valve 108, and a hydraulic function 110. The fluid pressure supply 102 may be configured to draw fluid (e.g., oil) from the tank 104 and furnish the fluid under increased pressure at a supply outlet 112. The supply outlet 112 may be in fluid communication with a supply line 114, and the tank 104 may be in fluid communication with a return line 116. In some non-limiting examples, the fluid pressure supply 102 may be a pump, an accumulator, or another pressure source.

In the illustrated non-limiting example, the first control valve 106 and the second control valve 108 are both solenoid-operated proportional control valves. The first control valve 106 may include a first supply port 118, a first control port 120, and a first reference or exhaust port 122. Similarly, the second control valve 108 may include a second supply port 124, a second control port 126, and a second reference or exhaust port 128. The first supply port 118 and the second supply port 124 may be in fluid communication with the supply line 114. The first reference port 122 may be in fluid communication with the return line 116. In the illustrated non-limiting example, the first control port 120 may be in fluid communication with the second control valve 108. Specifically, the first control port 120 may be in fluid communication with the second reference port 128. The second control port 126 may be in fluid communication with a workport 130 of the function 110.

In general, the function 110 may be a hydraulically-powered component on an off-highway vehicle. For example, the function 110 may be a hydraulic actuator that is used to power a brake cylinder, a clutch, or another component on an off-highway vehicle. The fluid supplied to the workport 130 by the first control valve 106 and/or the second control valve 108 may control the operation of the function 110. For example, in some non-limiting examples, a system pressure differential between the workport 130 (or the second control port 126) and the return line 116 (or the first reference port 122) may govern operation of the function 110. In other words, an amount of pressure supplied to the workport 130 from the supply line 114 via operation of the first control valve 106 and/or the second control valve 108 may govern operation of the function 110.

In the illustrated non-limiting example, the first control valve 106 may be selectively movable between a first position, a second position, and any position between the first position and the second position. In the first position, the first supply port 118 may be blocked, and fluid communication may be provided between the first reference port 122 and the first control port 120. In the second position, the first reference port 122 may be blocked, and fluid communication may be provided between the first supply port 118 and the first control port 120. In some non-limiting examples, the second position may correspond with a maximum distance that the first control valve 106 may move toward the second position, rather that connecting the supply line 114 to the first control port 120 with the connection between the first control port 120 and the first reference port 122 being fully closed. That is, the second position may be correlated with a maximum amount of displacement in a direction away the first position that the first control valve 106 may be displaced by a proportional solenoid coupled to the first control valve 106.

In general, the movement of the first control valve 106 between the first position, the second position, and any position between the first position and the second position may be governed by a balance of forces being applied by a first spring 134, a first control pilot line 136, a first return pilot line 138, and a first proportional solenoid 140. In some non-limiting examples, the first control valve 106 may include a spool, a poppet, or a piston that is movable in response the forces applied by the first spring 134, the first control pilot line 136, the first return pilot line 138, and the first proportional solenoid 140. The first spring 134 and the first control pilot line 136 may be biased on a first side of the first control valve 106, and the first return pilot line 138 and the first proportional solenoid 140 may be biased on a second side of the first control valve 106, opposite to the first side. The first control pilot line 136 may communicate pressure from the first control port 120 onto the first side of the first control valve 106. The first return pilot line 138 may communicate pressure from the first reference port 122 to the second side of the first control valve 106.

During operation, the pressure at the first control port 120 may be regulated by selectively energizing the first proportional valve 140 allowing the first control valve 106 to move between the first position and the second position, to connect the first control port 120 to the first supply port 118 or the first reference port 122. A control pressure differential between the first control port 120 and the first reference port 122 may be applied across the first control valve 106 via the first control pilot line 136 and the first return pilot line 138. A force of the control pressure differential and the force provided by the first spring 134 may be balanced by an output force provided by the first proportional solenoid 140 to regulate the pressure at the first control port 120.

For example, the first proportional solenoid 140 may apply an output force at a predefined magnitude. In response to the output force supplied by the first proportional solenoid 140, the first control valve 106 may move to any position between the first position and the second position depending on the balance of forces applied to the first control valve 106. Specifically, the first control valve 106 may move to a position where the predefined magnitude of force supplied by the first proportional solenoid 140 is balanced by the combined force of the first spring 134 and the control pressure drop between the first control port 120 and the first reference port 122. Since the force provided by the first spring 134 on the first control valve 106 may be calculated or known, the magnitude of force applied to the first control valve 106 by the first proportional solenoid 140 may be used to regulate the magnitude of the control pressure drop between the first control port 120 and the first reference port 122 and, thereby, regulate the pressure at the first control port 120.

The proportionality defined by the first proportional solenoid 140 may enable the first proportional solenoid 140 to output any output force within a range of output forces between a minimum output force and a maximum output force. In this way, for example, the first proportional solenoid 140 may regulate the control pressure drop across the first control valve 106 and the pressure at the first control port 120 by adjusting the magnitude of the output force provided to the first control valve 106. For example, if the amount of force provided to the first control valve 106 is increased, the forces on the first control valve 106 may become temporarily unbalanced. The first control valve 106 may move in response to the unbalanced forces (e.g., by increasing supply flow area between the first supply port 118 and the first control port 120 and decreasing return flow area between the first reference port 122 and the first control port 120, or vice versa) until the control pressure drop between the first control port 120 and the first reference port 122 achieves a value that rebalances the forces on the first control valve 106. The first proportional solenoid 140 may thus regulate the pressure at the first control port 120 between a first minimum pressure above the pressure at the first reference port 122 and a first maximum pressure above the pressure at the first reference port 122. In other words, the first control valve 106 may be operable to regulate the control pressure differential between the first control port 120 and the first reference port 122 within a first predefined range.

In the illustrated non-limiting example, the second control valve 108 may be selectively movable between a first position, a second position, and any position between the first position and the second position. In the first position, the second supply port 124 may be blocked, and fluid communication may be provided between the second reference port 128 and the second control port 126. In the second position, the second reference port 128 may be blocked, and fluid communication may be provided between the second supply port 124 and the second control port 126. In some non-limiting examples, the second position may correspond with a maximum distance that the second control valve 108 may move toward the second position, rather that connecting the supply line 114 to the second control port 126 with the connection between the second control port 126 and the second reference port 128 being fully closed. That is, the second position may be correlated with a maximum amount of displacement in a direction away the first position that the second control valve 108 may be displaced by a proportional solenoid coupled to the second control valve 108.

In general, the movement of the second control valve 108 between the first position, the second position, and any position between the first position and the second position may be governed by a balance of forces being applied by a second spring 142, a second control pilot line 144, a second return pilot line 146, and a second proportional solenoid 148. In some non-limiting examples, the second control valve 108 may include a spool, a poppet, or a piston that is movable in response the forces applied by the second spring 142, the second control pilot line 144, the second return pilot line 146, and the second proportional solenoid 148. The second spring 142 and the second control pilot line 144 may be biased on a first side of the second control valve 108, and the second return pilot line 146 and the second proportional solenoid 148 may be biased on a second side of the second control valve 108, opposite to the first side. The second control pilot line 144 may communicate pressure from the second control port 126 onto the first side of the first control valve 106. The second return pilot line 146 may communicate pressure from the second reference port 128 to the second side of the second control valve 108.

During operation, the pressure at the second control port 126 may be regulated by selectively energizing the first proportional valve 148 allowing the second control valve 108 to move between the first position and the second position, to connect the second control port 126 to the second supply port 124 or the second reference port 128. A control pressure differential between the second control port 126 and the second reference port 128 may be applied across the second control valve 108 via the second control pilot line 144 and the second return pilot line 146. A force of the control pressure differential and the force provided by the second spring 142 may be balanced by an output force provided by the second proportional solenoid 148 to regulate the pressure at the second control port 126.

For example, the second proportional solenoid 148 may apply an output force at a predefined magnitude. In response to the output force supplied by the second proportional solenoid 148, the second control valve 108 may move to any position between the first position and the second position depending on the balance of forces applied to the second control valve 108. Specifically, the second control valve 108 may move to a position where the predefined magnitude of force supplied by the second proportional solenoid 148 is balanced by the combined force of the second spring 142 and the control pressure drop between the second control port 126 and the second reference port 128. Since the force provided by the second spring 142 on the second control valve 108 may be calculated or known, the magnitude of force applied to the second control valve 108 by the second proportional solenoid 148 may be used to regulate the magnitude of the control pressure drop between the second control port 126 and the second reference port 128 and, thereby, regulate the pressure at the second control port 126.

The proportionality defined by the second proportional solenoid 148 may enable the second proportional solenoid 148 to output any output force within a range of output forces between a minimum output force and a maximum output force. In this way, for example, the second proportional solenoid 148 may regulate the control pressure drop across the second control valve 108 and the pressure at the second control port 126 by adjusting the magnitude of the output force provided to the second control valve 108. For example, if the amount of force provided to the second control valve 108 is increased, the forces on the second control valve 108 may become temporarily unbalanced. The second control valve 108 may move in response to the unbalanced forces (e.g., by increasing supply flow area between the second supply port 124 and the second control port 126 and decreasing return flow area between the second reference port 128 and the second control port 126, or vice versa) until the pressure drop between the second control port 126 and the second reference port 128 achieves a value that rebalances the forces on the second control valve 108. The second proportional solenoid 148 may thus regulate the pressure at the second control port 126 between a second minimum pressure above the pressure at the second reference port 128 and a second maximum pressure above the pressure at the second reference port 128. In other words, the second control valve 108 may be operable to regulate the control pressure differential between the second control port 126 and the second reference port 128 within a second predefined range.

The first proportional solenoid 140 and the second proportional solenoid 148 may be in communication with a controller 150. In some non-limiting examples, the controller 150 may include a processor and memory. In some non-limiting examples, the controller 150 may control an amount of current supplied to the first proportional solenoid 140 and the second proportional solenoid 148. In general, a force applied to the first control valve 106 may be proportional to a magnitude of current supplied to the first proportional solenoid 140. That is, unlike on-off or bi-stable solenoids, the first proportional solenoid 140 may be operable to regulate the pressure differential between the first control port 120 and the first reference port 122 to any number of stable pressure differentials by varying a magnitude of current supplied to the first proportional solenoid 140 by the controller 150. Similarly, a force applied to the second control valve 108 may be proportional to a magnitude of current supplied to the second proportional solenoid 148. That is, unlike on-off or bi-stable solenoids, the second proportional solenoid 148 may be operable to regulate the pressure differential between the second control port 126 and the second reference port 128 to any number of stable pressure differentials by varying a magnitude of current supplied to the second proportional solenoid 148 by the controller 150.

In the illustrated non-limiting example, the controller 150 may be in communication with a demand sensor 152. The demand sensor 152 may be in communication with a component on the off-highway vehicle (e.g., a pedal, a joystick, a switch, a dial, etc.) and may be configured to output a signal to the controller 150 that is corresponds to a demand or system pressure differential to be supplied to the function 110. For example, if the demand sensor provides an output to increase the demand, the controller 150 may energize the first proportional solenoid 140, the second proportional solenoid 148, or the first proportional solenoid 140 and the second proportional solenoid 148 to increase the system pressure differential and, thereby, increase the pressure at the second control port 126 or the workport 130.

In general, the nested arrangement of the first control valve 106 and the second control valve 108 may enable a pressure supplied to the workport 130 to be regulated within a range that is twice what the first control valve 106 and the second control valve 108 may be capable of individually. With the first control port 120 in fluid communication with the second reference port 128, the first control valve 106 and the second control valve 108 may operate additively from a pressure regulation perspective. For example, the control pressure differential between the first control port 120 and the first reference port 122 regulated by the first control valve 106 and the control pressure differential between the second control port 126 and the second reference port 128 regulated by the second control valve 108 may define the same operating or control range of pressure differentials (i.e., the first predefined range may be equal to the second predefined range). However, the nested arrangement between the first control valve 106 and the second control valve 108 may enable a system pressure differential (e.g., a pressure differential between the workport 130 and the return line 116) to be regulated within a range that is equal to the sum of the first predefined range regulated by the first control valve 106 and the second predefined range regulated by the second control valve 108. In other words, the controller 150 may control the system pressure differential provided by operation of the first control valve 106, the second control valve 106, or the first control valve 106 and the second control valve 108 between a minimum system pressure defined by a minimum pressure in a combination of the first predefined range and the second predefined range and a system maximum pressure defined by a sum of a maximum pressure in each of the first predefined range and the second predefined range.

Figure 2:
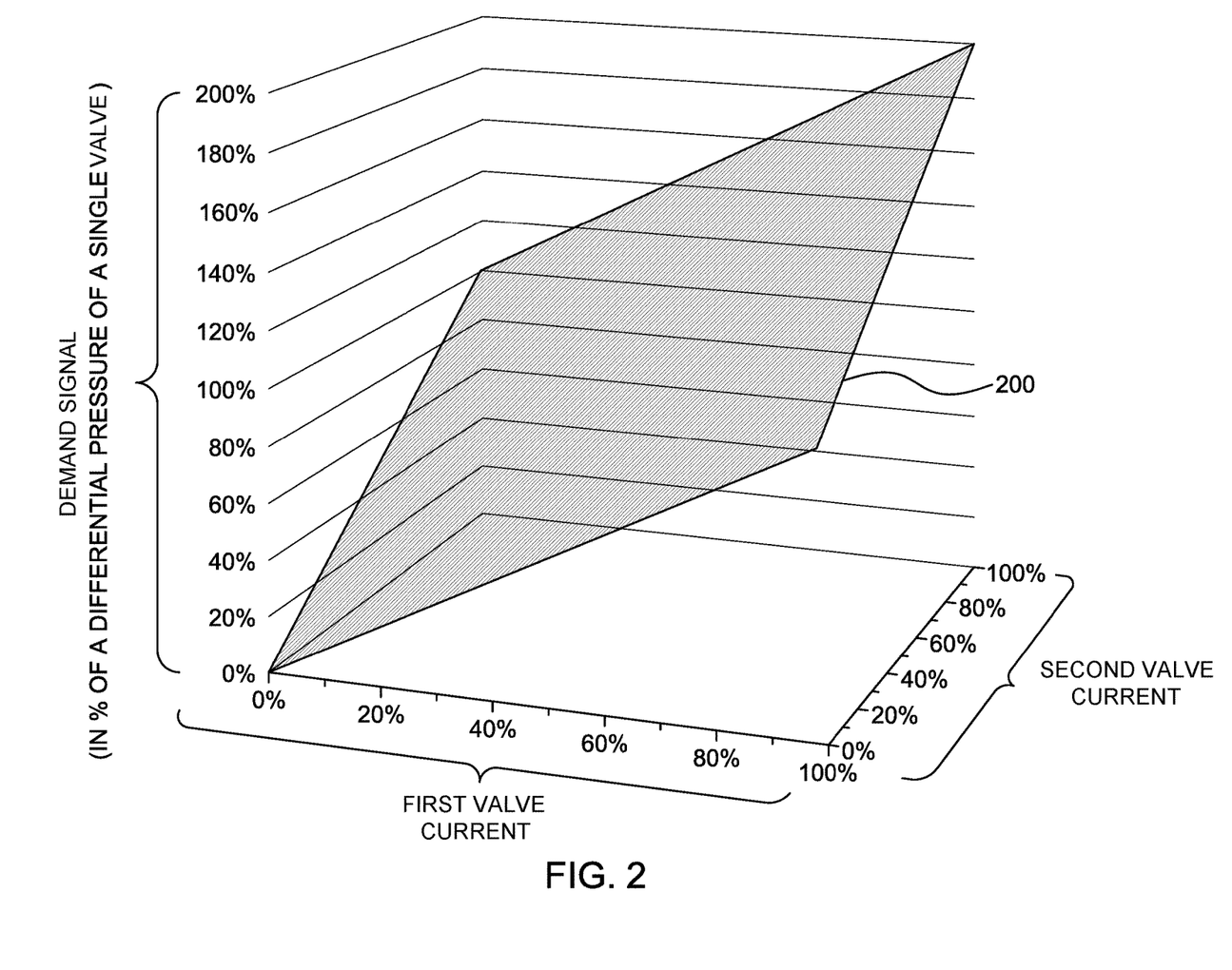
FIG. 2 is a graph illustrating a surface of workport pressure as a function of a current command to a first control valve and a current command to a second control valve.

Operation of the hydraulic system 100 will be described with reference to FIGS. 1 and 2. It should be appreciated that the following quantitative examples of the pressure regulation ranges provided the first control valve 106, the second control valve 108, and the combination of the first control valve 106 and the second control valve 108 are provided for illustrative purposes and are not meant to be limiting in any way. In other non-limiting examples, the first control valve 106 and the second control valve 108 may be designed to provide any pressure regulation range as needed for a given application.

In general, if a demand signal from the demand sensor 152 is sent to the controller 150 that corresponds to a demand pressure differential that is less than or equal to a maximum pressure differential in the first predefined range of the first control valve 106, the controller 150 may utilize either the first control valve 106 or the first control valve 106 and the second control valve 108 to provide the demand pressure differential between the workport 130 and the return line 116. For example, the controller 150 may energize the first proportional solenoid 140 to provide an output force on the first control valve 106 that corresponds with providing the demand pressure differential between the first control port 120 and the first reference port 122. The controller 150 may de-energize the second proportional solenoid 148, which results in the demand pressure differential supplied by the first control valve 106 being provided between the workport 130 and the return line 116 (i.e., the demand pressure differential may be equal to the system pressure differential). Alternatively, if the demand pressure differential is within the second predefined range provided by the second control valve 108, the controller 150 may energize the second proportional solenoid 148 to provide an output force on the second control valve 108 that corresponds with providing the demand pressure differential between the second control port 126 and the second reference port 128, which may also be provided between the workport 130 and the return line 116 if the first proportional solenoid 140 is de-energized.

Alternatively, the controller 150 may energize the first proportional solenoid 140 to provide an output force on the first control valve 106 that corresponds with providing a first portion of the demand pressure differential between the first control port 120 and the first reference port 122. The controller 150 may also energize the second proportional solenoid 148 to provide an output force on the second control valve 108 that corresponds with providing a second portion of the demand pressure differential between the second control port 126 and the second reference port 128. The second portion of the demand pressure differential provided by the second control valve 108 may be equal to the demand pressure differential minus the first portion of the demand pressure differential provided by the first control valve 106. In this way, for example, the first portion of the demand pressure differential may add to the second portion of the demand pressure differential provided by the second control valve 108 to provide the demand pressure differential between the workport 130 and the return line 116.

Similarly, if a demand signal from the demand sensor 152 is sent to the controller 150 that corresponds to a demand pressure differential that is less than or equal to a maximum pressure differential in the second predefined range of the second control valve 108, the controller 150 may utilize either the second control valve 108 or the first control valve 106 and the second control valve 108 to provide the demand pressure differential between the workport 130 and the return line 116. For example, the controller 150 may energize the second proportional solenoid 148 to provide an output force on the second control valve 108 that corresponds with providing the demand pressure differential between the second control port 126 and the second reference port 128, which is also provided between the workport 130 and the return line 116.

Alternatively, the controller 150 may energize the second proportional solenoid 148 to provide an output force on the second control valve 108 that corresponds with providing a first portion of the demand pressure differential between the second control port 126 and the second reference port 128. The controller 150 may also energize the first proportional solenoid 140 to provide an output force on the first control valve 106 that corresponds with providing a second portion of the demand pressure differential between the first control port 120 and the first reference port 122. The second portion of the demand pressure differential may be equal to the demand pressure differential minus the first portion of the demand pressure differential provided by the second control valve 108. In this way, for example, the second portion of the demand pressure differential provided by the first control valve 106 may add to the first portion of the demand pressure differential provided by the second control valve 108 to supply the demand pressure differential between the workport 130 and the return line 116.

In one non-limiting example, the function 110 may be a hydraulic actuator that requires a pressure operating range from 0 bar to 60 bar. Rather than using a single pressure regulation valve to cover the entire operating range, the nested arrangement provided by the hydraulic system 100 may be implemented to control the operation of the function 110. For example, the pressure differential between the first control port 120 and the first reference port 122 may be regulated by the first control valve 106 between 0 bar and 30 bar (i.e., the first predefined range is between 0 bar and 30 bar), and the pressure differential between the second control port 126 and the second reference port 128 regulated by the second control valve 108 between 0 bar and 30 bar (i.e., the second predefined range is between 0 bar and 30 bar).

In some non-limiting examples, if a demand signal from the demand sensor 152 is sent to the controller 150 that corresponds to a demand pressure differential that is less than or equal to 30 bar, the controller 150 may instruct either the first control valve 106 or the second control valve 108 to provide a pressure differential between the first control port 120 and the first reference port 122 or between the second control port 126 and the second reference port 128 that is equal to the demand pressure differential. For example, the controller 150 may energize the first proportional solenoid 140 to provide an output force on the first control valve 106 that corresponds with providing the demand pressure differential between the first control port 120 and the first reference port 122, and the controller 150 may de-energize the second proportional solenoid 148. As described herein, the proportionality of the first proportional solenoid 140 may enable the first control valve 106 to provide any pressure differential within the first predefined range. In this non-limiting example, the controller 150 may supply the first proportional solenoid 140 with a magnitude of current that corresponds an output force that results in providing the demand pressure differential between the first control port 120 and the first reference port 122. With the second proportional solenoid 148 de-energized, the second control valve 108 may remain in the first position via the bias of the second spring 142, and the demand pressure differential between the first control port 120 and the first reference port 122 may be provided between the workport 130 and the return line 116 (i.e., the system pressure differential may be equal to the demand pressure differential).

Alternatively, if a demand signal from the demand sensor 152 is sent to the controller 150 that corresponds to a demand pressure differential that is less than or equal to 30 bar, the controller 150 may de-energize the first proportional solenoid 140, and may energize the second proportional solenoid 148. With the first proportional solenoid 140 de-energized, the first control valve 106 may be biased into the first position by the first spring 134 and the pressure in the return line 116 may be provided through the first reference port 122 and the first control port 120 to the second reference port 128. The controller 150 may supply the second proportional solenoid 148 with a magnitude of current that corresponds with an output force that provides the demand pressure differential between the second control port 126 and the second reference port 128. With the first proportional solenoid 140 de-energized, the demand pressure differential provided by the second control valve 108 may then be provided between the workport 130 and the return line 116.

In some non-limiting examples, if a demand signal from the demand sensor 152 is sent to the controller 150 that corresponds to a demand pressure differential that is less than or equal to 30 bar, the controller 150 may utilize both of the first control valve 106 and the second control valve 108 to supply the demand pressure differential between the workport 130 and the return line 116. For example, if the demand signal corresponds with a demand pressure differential of 30 bar, the first control valve 106 and the second control valve 108 may additively supply the demand pressure differential. In one non-limiting example, the controller 150 may energize the first proportional solenoid 140 with a magnitude of current that corresponds with providing 15 bar pressure differential between the first control port 120 and the first reference port 122.

The 15 bar pressure differential between the first control port 120 first reference port 122 may be supplied to the second reference port 128. The controller 150 may also energize the second proportional solenoid 148 with a magnitude of current that corresponds with providing a pressure differential between the second control port 126 and the second reference port 128 of 15 bar. Since the first control valve 106 raised the pressure at the second reference port 128 to 15 bar, the 15 bar of pressure differential provided by the second control valve 108 may add to the pressure differential provided by the first control valve 106 to raise the pressure differential between the first reference port 122 and the second control port 126, and thereby between the workport 130 and the return line 116, to 30 bar (i.e., the system pressure differential may be 30 bar). It should be appreciated that the controller 150 may operate the first control valve 106 and the second control valve 108 to supply a demand pressure using any additive pair of pressures that meets a demand pressure. For example, to meet a 30 bar demand pressure differential, the first control valve 106 may provide 1 bar, 5 bar, or 10 bar of differential pressure and the second control valve 108 may provide 29 bar, 25 bar, or 20 bar of differential, respectively. Alternatively, to meet a 30 bar demand pressure, the first control valve 106 may provide 29 bar, 25 bar, or 20 bar of differential pressure and the second control valve 108 may provide 1 bar, 5 bar, or 10 bar of differential pressure, respectively. In other words, the first control valve 106 and the second control valve 108 may be operated by the controller 150 to provide any pair of pressure differentials that add to the demand pressure output by the demand sensor 152.

In general, if a demand signal from the demand sensor 152 is sent to the controller 150 that corresponds to a demand pressure differential that is greater than a maximum pressure in the first predefined range of the first control valve 106 or the second predefined range of the second control valve 108, the controller 150 may utilize the first control valve 106 and the second control valve 108 to additively provide the demand pressure differential at the workport 130. In one non-limiting example, the controller 150 may energize the first proportional solenoid 140 to provide an output force on the first control valve 106 that corresponds with providing a maximum pressure differential in the first predefined ranged (e.g., a maximum current may be supplied to the first proportional solenoid 140), and may energize the second proportional solenoid 148 to provide an output force on the second control valve 108 that corresponds with providing a pressure differential between the second reference port 128 and the second reference port 128 that is equal to the demand pressure differential minus the maximum pressure differential provided by the first control valve 106, or vice versa (i.e., the second control valve 108 is forced to provide a maximum pressure differential and the first control valve 106 is used to supplement and reach the demand pressure differential). In this way, for example, the control pressure differential provided by the second control valve 108 may add to the maximum pressure differential provided by the first control valve 106 to provide the demand pressure differential between the second control port 126 and the first reference port 116, and thereby between the workport 130 and the return line 116.

Alternatively, the controller 150 may utilize each of the first control valve 106 and the second control valve 108 to provide pressure differentials that are less than a maximum pressure in the first predefined range and the second predefined range and that add to the demand pressure differential. For example, the controller 150 may energize the first proportional solenoid 140 to provide an output force on the first control valve 106 that corresponds with providing a first portion of the demand pressure differential between the first control port 120 and the first reference port 122. The controller 150 may also energize the second proportional solenoid 148 to provide an output force on the second control valve 108 that corresponds with providing a second portion of the demand pressure differential between the second control port 126 and the second reference port 128. The second portion of the demand pressure differential provided by the second control valve 108 may be equal to the demand pressure differential minus the first portion of the demand pressure differential provided by the first control valve 106. In this way, the first portion of the demand pressure differential may add to the second portion of the demand pressure differential provided by the second control valve 108 to provide the demand pressure differential between the second control port 126 and the first reference port 116, and thereby between the workport 130 and the return line 116. In any case, the first control valve 106 and the second control valve 108 may be operated by the controller to provide any pair of pressure differentials that add to the demand pressure differential.

Referring to the non-limiting example where the function 110 may require a pressure differential operating range from 0 bar to 60 bar, the first predefined range of the first control valve 106 may be between 0 bar and 30 bar, and the second predefined range of the second control valve 108 may be between 0 bar and 30 bar, if a demand signal from the demand sensor 152 is sent to the controller 150 that corresponds to a demand pressure differential that is 40 bar, the controller 150 may utilize the first control valve 106 and the second control valve 108 to additively provide the demand pressure differential between the first reference port 118 and the second control port 126, and thereby between the workport 130 and the return line 116. For example, in one non-limiting example, the controller 150 may energize the first proportional solenoid 140 to provide a maximum output force on the first control valve 106 to provide the maximum pressure differential in the first predefined range (e.g., 30 bar), and may energize the second proportional solenoid 148 to provide a pressure differential between the second control port 126 and the second reference port 128 equal to the demand pressure differential minus the maximum pressure differential provided by the first control valve 106 (e.g., 10 bar), or vice versa (e.g., the second control valve 108 provides 30 bar and the first control valve 106 provides 10 bar).

Alternatively, the controller 150 may utilize the first control valve 106 and the second control valve 108 to provide a pair of pressure differentials that are less than a maximum pressure of the first predefined range and the second predefined range, and that add to the demand pressure differential. For example, the controller 150 may energize the first proportional solenoid 140 to provide on output force on the first control valve 106 that corresponds with providing 20 bar differential between the first control port 120 and the first reference port 122, and may energize the second proportional solenoid 148 to provide an output force on the second control valve 108 that corresponds with a 20 bar pressure differential between the second control port 126 and the second reference port 128, which adds to the 20 bar differential provided by the first control valve 106 to provide the 40 bar demand pressure differential between the first reference port 118 and the second control port 126, and thereby between the workport 130 and the return line 116. Alternatively, to meet a 40 bar demand pressure differential, the first control valve 106 may provide 10 bar, or 15 bar pressure differential and the second control valve 108 may provide 30 bar, or 25 bar pressure differential, respectively. Alternatively, to meet a 40 bar demand pressure differential, the first control valve 106 may provide 30 bar, or 25 bar pressure differential and the second control valve 108 may provide 10 bar, or 15 bar pressure differential, respectively.

As described herein, the proportionality of the first proportional solenoid 140 and the second proportional solenoid 148 may enable the first control valve 106 and the second control valve 108 to provide any pressure differential within the first predefined range and the second predefined range, respectively. As such, the combination of the first control valve 106 and the second control valve 108 may be used individually or additively to provide any demand outputs from the demand sensor 152. For example, FIG. 2 illustrates a surface 200 of possible demand requests or outputs from the demand sensor 152 (in a percentage of a pressure differential provided by a single valve, e.g., a single valve may supply 100% but the additive combination may supply 200%) as a function of current magnitude supplied to the first proportional solenoid 140 and the second proportional solenoid 148. As illustrated in FIG. 2, the first proportional solenoid 140 and the second proportional solenoid 148 may be supplied with a current that ranges from a minimum current (e.g., 0% of a maximum current) to a maximum current (e.g., 100% of a maximum current). The magnitude of current may correspond with a specific pressure differential between the respective control port and the reference port. That is, a current magnitude supplied to the first control valve 106 and the second control valve 108 by the controller 150 may be mapped to a corresponding pressure differential between the respective control and reference ports of the first control valve 106 and the second control valve 108. In this way, for example, the controller 150 may energize the first proportional solenoid 140 and/or the second proportional solenoid 148 to additively achieve any of the demand outputs on the surface 200. It should be appreciated that the linear relationship between current and workport pressure illustrated in FIG. 2 is not meant to be limiting in any way, and that the shape of the surface 200 may take any form that corresponds to the relationship between the control pressure differential and current magnitude defined by the first control valve 106 and the second control valve 108.

In general, the nested arrangement of the first control valve 106 and the second control valve 108 may provide several advantages over conventional pressure regulation valve arrangements. For example, a cost of a solenoid may be exponentially proportional to a maximum output force provided by the solenoid. As such, utilizing two proportional solenoids with lower maximum output forces, rather than one solenoid that may supply an output force capable of achieving a maximum demand pressure required by a function, may reduce costs associated with the hydraulic system 100. In addition, the use of two nested control valves, rather than a single control valve, may provide higher resolution in the control of the workport pressure, when compared to the resolution of a single control valve.

Figure 3:
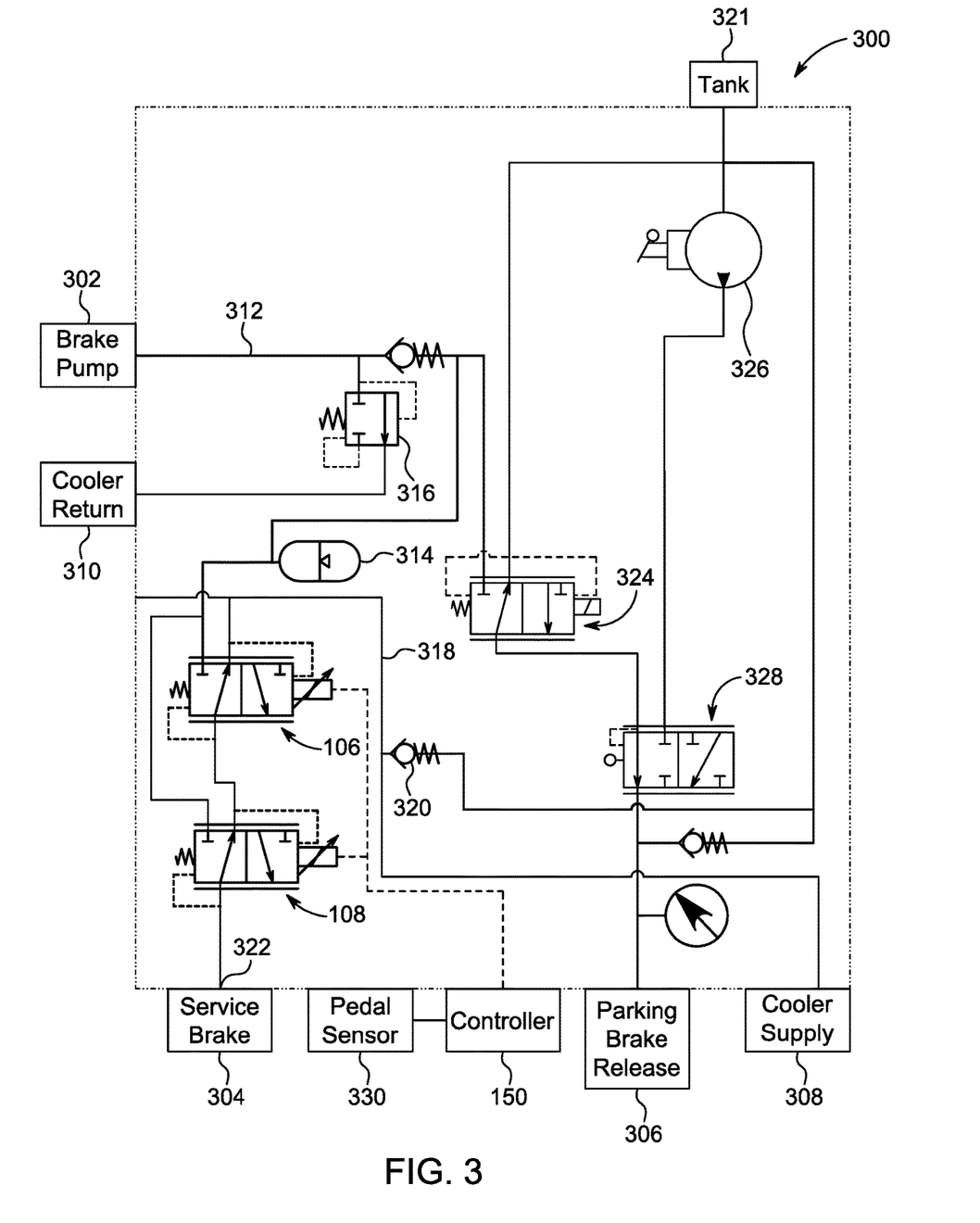
FIG. 3 is a schematic illustration of the nested pressure regulation valves of FIG. 1 in a braking system of an off-highway vehicle according to one aspect of the present disclosure.

With reference to FIG. 3, in one non-limiting example, the nested arrangement of the first control valve 106 and the second control valve 108 may be implemented in a braking system 300 on an off-highway vehicle. As illustrated in FIG. 3, the braking system 300 may include a brake pump 302, a service brake 304, a parking brake release 306, a cooler supply 308, and a cooler return 310. The brake pump 302 may provide supply pressure to a supply line 312 that is in fluid communication with an accumulator 314. A supply pressure relief valve 316 may be in fluid communication with the supply line 312 and may be configured to limit the supply pressure in the supply line 312 to a predefined maximum supply pressure (e.g., 80 bar). The supply pressure relief valve 316 may be in fluid communication with the cooler return 210. The accumulator 314 may store the supply pressure from the brake pump 302 to enable the service brake 304 to be applied, for example, when the brake pump 302 is not supplying pressure (e.g., engine off).

The supply line 312 and the accumulator 314 may be in fluid communication with the first supply port 118 and the second supply port 124. The first reference port 122 may be in fluid communication with a cooler supply line 318 or any line directly connected to a tank 321. In the illustrated non-limiting example, the cooler supply line 318 is in fluid communication with the cooler supply 308 (e.g., a pump). The pressure in the cooler supply line 318 may be limited to a low pressure (e.g., less than 1 bar) by a cooler supply check valve 320 that is arranged between the cooler supply line 318 and the tank 321. In other words, the cooler supply line 318 may be in fluid communication with the tank 321 through the cooler supply check valve 320. The second control port 126 may be in fluid communication with a workport 322 of the service brake 304.

If the parking brake release 306 is supplied with pressure, a parking brake (not shown) may be released. A brake release control valve 324 may control the operation of the brake release 306. For example, if the brake release control valve 324 is energized, the supply pressure in the supply line 312 may be provided to the parking brake release 306 and the parking brake (not shown) may release. Alternatively, if the engine is off and the brake pump 302 is not providing supply pressure, a manual hand pump 326 and manual over-ride valve 328 may be energized to supply pressure to the brake release 306.

In general, the first control valve 106 and the second control valve 108 may control a pressure differential between the workport 322 and the cooler supply line 318 in response to a demand of the service brake 304 provided by a foot pedal sensor 304. In some non-limiting examples, the foot pedal sensor 330 may provides a variable signal corresponding to a demand pressure differential to be supplied to the service brake 304. The foot pedal sensor 330 may be in communication with the controller 150, and the controller 150 may be configured to supply a demand pressure differential between the workport 322 and the cooler supply line 318 using the first control valve 106, the second control valve 108, or an additive combination of the first control valve 106 and the second control valve 108. The output signal provided to the controller 150 from the foot pedal sensor 330 may be mapped to a demand pressure/current provided by the first control valve 106, the second control valve 108, and/or an additive combination of the first control valve 106 and the second control valve 108. For example, the surface 200 illustrated in FIG. 2 may be developed, such that the Z-axis represents the output signal from the foot pedal sensor 330 and the X-axis and Y-axis represent pressure/current values for the first control valve 106 and the second control valve 108. The first control valve 106, the second control valve 108, and/or an additive combination of the first control valve 106 and the second control valve 108 may be utilized by the controller 150 to provide the demand pressure differential between the workport 322 and the cooler supply line 318 in accordance with the operation of the hydraulic system 100 described herein.

Within this specification embodiments have been described in a way which enables a clear and concise specification to be written, but it is intended and will be appreciated that embodiments may be variously combined or separated without parting from the invention. For example, it will be appreciated that all preferred features described herein are applicable to all aspects of the invention described herein.

Thus, while the invention has been described in connection with particular embodiments and examples, the invention is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publication were individually incorporated by reference herein.

Various features and advantages of the invention are set forth in the following claims.

We claim:

1. A hydraulic system, comprising:
a fluid pressure source in fluid communication with a supply line;
a return line in fluid communication with a tank;
a hydraulic function including a workport;
a first control valve including a first supply port, a first control port, a first reference port, and a first proportional solenoid, wherein the first supply port is in fluid communication with the supply line and the first reference port is in fluid communication with the return line, wherein the first proportional solenoid is configured to provide a first output force on the first control valve to control a first pressure differential between the first control port and the first reference port within a first predefined range;
a second control valve including a second supply port, a second control port, a second reference port, and a second proportional solenoid, wherein the second supply port is in fluid communication with the supply line, the second reference port is in fluid communication with the first control port, and the second control port is in fluid communication with the workport, and wherein the second proportional solenoid is configured to provide a second output force on the second control valve to control a second pressure differential between the second control port and the second reference port within a second predefined range; and
a controller in communication with the first proportional solenoid and the second proportional solenoid, the controller being configured to:
selectively energize the first proportional solenoid, the second proportional solenoid, or the first proportional solenoid and the second proportional solenoid to control a system pressure differential, defined between the return line and the workport, within a range that is defined by a sum of the first predefined range and the second predefined range.

2. The hydraulic system of claim 1, wherein the controller is in communication with a demand sensor that is configured to output a demand signal that corresponds to the system pressure differential to be supplied to the hydraulic function.

3. The hydraulic system of claim 2, wherein when the demand signal corresponds to the system pressure differential being less than or equal to a maximum pressure defined by the first predefined range, the controller is configured to energize the first proportional solenoid to provide the first output force on the first control valve with a magnitude that corresponds with providing a demand pressure differential at the workport.

4. The hydraulic system of claim 2, wherein when the demand signal corresponds to the system pressure differential being less than or equal to a maximum pressure defined by the first predefined range, the controller is configured to energize the first proportional solenoid to provide the first output force on the first control valve with a magnitude that corresponds with providing a first portion of a demand pressure differential at the first control port and energize the second proportional solenoid to provide the second output force on the second control valve so that the second pressure differential is equal to the demand pressure differential minus the first portion of the demand pressure differential provided by the first control valve.

5. The hydraulic system of claim 4, wherein the fluid communication between the first control port and the second reference port enables the first portion of the demand pressure differential to additively combine with the second pressure differential to provide the demand pressure differential at the workport.

6. The hydraulic system of claim 2, wherein when the demand signal corresponds to a demand pressure differential that is greater than a maximum pressure defined by the first predefined range, the controller is configured to energize the first proportional solenoid to provide the first output force on the first control valve and to energize the second proportional solenoid to provide the second output force on the second control valve.

7. The hydraulic system of claim 6, wherein the controller is configured to energize the first proportional solenoid to provide the maximum pressure defined by the first predefined range and energize the second proportional solenoid so that the second pressure differential is equal to the demand pressure differential minus the maximum pressure defined by the first predefined range.

8. The hydraulic system of claim 6, wherein the controller is configured to energize the first proportional solenoid to provide the first output force on the first control valve with a magnitude that corresponds with providing a first portion of the demand pressure differential at the first control port and energize the second proportional solenoid to move the second control valve so that the second pressure differential is equal to the demand pressure differential minus the first portion of the demand pressure differential provided by the first control valve, and wherein the first portion of the demand pressure differential is less than the maximum pressure defined by the first predefined range and the second pressure differential is less than a maximum pressure defined by the second predefined range.

9. The hydraulic system of claim 6, wherein the controller is configured to energize the first proportional solenoid and the second proportional solenoid so that a sum of the first pressure differential and the second pressure differential is equal to the demand pressure differential.

10. The hydraulic system of claim 1, wherein the range that is defined by the sum of the first predefined range and the second predefined range extends from a minimum system pressure differential defined by a minimum pressure in a combination of the first predefined range and the second predefined range to a maximum system pressure differential defined by a sum of a maximum pressure in each of the first predefined range and the second predefined range.

11. A hydraulic system, comprising:
a fluid pressure source in fluid communication with a supply line;
a return line in fluid communication with a tank;
a hydraulic function including a workport;
a first control valve including a first supply port, a first control port, a first reference port, and a first proportional solenoid, wherein the first supply port is in fluid communication with the supply line and the first reference port is in fluid communication with the return line, wherein the first proportional solenoid is configured to provide a first output force on the first control valve to control a first pressure differential between the first control port and the first reference port within a first predefined range;
a second control valve including a second supply port, a second control port, a second reference port, and a second proportional solenoid, wherein the second supply port is in fluid communication with the supply line, the second reference port is in fluid communication with the first control port, and the second control port is in fluid communication with the workport, and wherein the second proportional solenoid is configured to provide a second output force on the second control valve to control a second pressure differential between the second control port and the second reference port within a second predefined range; and
a controller in communication with the first proportional solenoid and the second proportional solenoid, the controller being configured to:
selectively energize the first proportional solenoid, the second proportional solenoid, or the first proportional solenoid and the second proportional solenoid to control a system pressure differential, defined between the return line and the workport, from a minimum system pressure differential defined by a minimum pressure in a combination of the first predefined range and the second predefined range to a maximum system pressure differential defined by a sum of a maximum pressure in each of the first predefined range and the second predefined range.

12. The hydraulic system of claim 11, wherein the controller is in communication with a demand sensor that is configured to output a demand signal that corresponds to the system pressure differential to be supplied to the hydraulic function.

13. The hydraulic system of claim 12, wherein when the demand signal corresponds to the system pressure differential being less than or equal to a maximum pressure defined by the first predefined range, the controller is configured to energize the first proportional solenoid to provide the first output force on the first control valve with a magnitude that corresponds with providing a demand pressure differential at the workport.

14. The hydraulic system of claim 12, wherein when the demand signal corresponds to the system pressure differential being less than or equal to a maximum pressure defined by the first predefined range, the controller is configured to energize the first proportional solenoid to provide the first output force on the first control valve with a magnitude that corresponds with providing a first portion of a demand pressure differential at the first control port and energize the second proportional solenoid to provide the second output force on the second control valve so that the second pressure differential is equal to the demand pressure differential minus the first portion of the demand pressure differential provided by the first control valve.

15. The hydraulic system of claim 14, wherein the fluid communication between the first control port and the second reference port enables the first portion of the demand pressure differential to additively combine with the second pressure differential to provide the demand pressure differential at the workport.

16. The hydraulic system of claim 12, wherein when the demand signal corresponds to a demand pressure differential that is greater than a maximum pressure defined by the first predefined range, the controller is configured to energize the first proportional solenoid to provide the first output force on the first control valve and to energize the second proportional solenoid to provide the second output force on the second control valve.

17. The hydraulic system of claim 16, wherein the controller is configured to energize the first proportional solenoid to provide the maximum pressure defined by the first predefined range and energize the second proportional solenoid so that the second pressure differential is equal to the demand pressure differential minus the maximum pressure defined by the first predefined range.

18. The hydraulic system of claim 16, wherein the controller is configured to energize the first proportional solenoid to provide the first output force on the first control valve with a magnitude that corresponds with providing a first portion of the demand pressure differential at the first control port and energize the second proportional solenoid to move the second control valve so that the second pressure differential is equal to the demand pressure differential minus the first portion of the demand pressure differential provided by the first control valve, and wherein the first portion of the demand pressure differential is less than the maximum pressure defined by the first predefined range and the second pressure differential is less than a maximum pressure defined by the second predefined range.

19. The hydraulic system of claim 16, wherein the controller is configured to energize the first proportional solenoid and the second proportional solenoid so that a sum of the first pressure differential and the second pressure differential is equal to the demand pressure differential.

20. A hydraulic system, comprising:
a fluid pressure source in fluid communication with a supply line;
a return line in fluid communication with a tank;
a hydraulic function including a workport;
a first control valve and a second control valve each including a supply port, a control port, a reference port, and a proportional solenoid, wherein each of the supply ports is in fluid communication with the supply line and the control port of the first control valve is in fluid communication with the reference port of the second control valve, and wherein each of the proportional solenoids is configured to selectively provide an output force on a respective one of the first control valve and the second control valve to control a system pressure differential defined between the reference port of the first control valve and the control port of the second control valve; and
a controller in communication with each of the proportional solenoids, the controller being configured to:
selectively energize the proportional solenoid of the first control valve, the proportional solenoid of the second control valve, or both of the proportional solenoids to control the system pressure differential, wherein the fluid communication between the control port of the first control valve and the reference port of the second control valve enables the first control valve and the second control valve to additively regulate the system pressure differential.

21. The hydraulic system of claim 20, wherein the proportional solenoid of the first control valve is configured to provide a first output force on the first control valve to control a first pressure differential between the control port of the first control valve and the reference port of the first control valve within a first predefined range, and the proportional solenoid of the second control valve is configured to provide a second output force on the second control valve to control a second pressure differential between the control port of the second control valve and the reference port of the second control valve within a second predefined range.

22. The hydraulic system of claim 21, wherein the controller is configured to control the system pressure differential from a minimum system pressure differential defined by a minimum pressure in a combination of the first predefined range and the second predefined range to a maximum system pressure differential defined by a sum of a maximum pressure in each of the first predefined range and the second predefined range.

23. The hydraulic system of claim 21, wherein the controller is configured to control the system pressure differential within a range that is defined by a sum of the first predefined range and the second predefined range.

24. The hydraulic system of claim 21, wherein the controller is in communication with a demand sensor that is configured to output a demand signal that corresponds to the system pressure differential to be supplied to the hydraulic function.

25. The hydraulic system of claim 24, wherein when the demand signal corresponds to the system pressure differential being less than or equal to a maximum pressure defined by the first predefined range, the controller is configured to energize the proportional solenoid of the first control valve to provide the first output force on the first control valve with a magnitude that corresponds with providing a demand pressure differential at the workport.

26. The hydraulic system of claim 24, wherein when the demand signal corresponds to the system pressure differential being less than or equal to a maximum pressure defined by the first predefined range, the controller is configured to energize the proportional solenoid of the first control valve to provide the first output force on the first control valve with a magnitude that corresponds with providing a first portion of a demand pressure differential at the control port of the first control valve and energize the proportional solenoid of the second control valve to provide the second output force on the second control valve so that the second pressure differential is equal to the demand pressure differential minus the first portion of the demand pressure differential provided by the first control valve.

27. The hydraulic system of claim 26, wherein the fluid communication between the control port of the first control valve and the reference port of the second control valve enables the first portion of the demand pressure differential to additively combine with the second pressure differential to provide the demand pressure differential at the workport.

28. The hydraulic system of claim 24, wherein when the demand signal corresponds to a demand pressure differential that is greater than a maximum pressure defined by the first predefined range, the controller is configured to energize the proportional solenoid of the first control valve to provide the first output force on the first control valve and to energize the proportional solenoid of the second control valve to provide the second output force on the second control valve.

29. The hydraulic system of claim 28, wherein the controller is configured to energize the proportional solenoid of the first control valve to provide the maximum pressure defined by the first predefined range and energize the proportional solenoid of the second control valve so that the second pressure differential is equal to the demand pressure differential minus the maximum pressure defined by the first predefined range.

30. The hydraulic system of claim 28, wherein the controller is configured to energize the proportional solenoid of the first control valve to provide the first output force on the first control valve with a magnitude that corresponds with providing a first portion of the demand pressure differential at the control port of the first control valve and energize the proportional solenoid of the second control valve to move the second control valve so that the second pressure differential is equal to the demand pressure differential minus the first portion of the demand pressure differential provided by the first control valve, and wherein the first portion of the demand pressure differential is less than the maximum pressure defined by the first predefined range and the second pressure differential is less than a maximum pressure differential defined by the second predefined range.

31. The hydraulic system of claim 28, wherein the controller is configured to energize the proportional solenoid of the first control valve and the proportional solenoid of the second control valve so that a sum of the first pressure differential and the second pressure differential is equal to the demand pressure differential.

* * * * *